US011891062B2

(12) United States Patent
Flaum et al.

(10) Patent No.: US 11,891,062 B2
(45) Date of Patent: Feb. 6, 2024

(54) VELOCITY ADJUSTMENT SYSTEM FOR A VEHICLE, AND METHOD FOR ADJUSTING A DRIVING VELOCITY

(71) Applicant: ZF CV Systems Hannover GmbH, Hannover (DE)

(72) Inventors: Nikolai Flaum, Hannover (DE); Ralph-Carsten Luelfing, Garbsen (DE); Gerd Schuenemann, Laatzen (DE); Torsten Wallbaum, Duingen (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 259 days.

(21) Appl. No.: 17/611,584

(22) PCT Filed: May 14, 2020

(86) PCT No.: PCT/EP2020/063400
§ 371 (c)(1),
(2) Date: Nov. 16, 2021

(87) PCT Pub. No.: WO2020/234095
PCT Pub. Date: Nov. 26, 2020

(65) Prior Publication Data
US 2022/0227369 A1 Jul. 21, 2022

(30) Foreign Application Priority Data
May 20, 2019 (DE) ...................... 10 2019 113 225.8

(51) Int. Cl.
*B60W 30/00* (2006.01)
*B60W 30/14* (2006.01)
(Continued)

(52) U.S. Cl.
CPC ........... *B60W 30/143* (2013.01); *B60K 26/04* (2013.01); *B60W 10/06* (2013.01); *B60W 10/18* (2013.01);
(Continued)

(58) Field of Classification Search
CPC .... B60W 30/143; B60W 10/06; B60W 10/18; B60W 30/18127; B60W 50/16; B60K 26/04; B60K 2026/046; B60K 26/00
See application file for complete search history.

(56) References Cited

U.S. PATENT DOCUMENTS 10,155,516 B2   12/2018  Kelly
10,272,907 B2 *  4/2019  Johri ..................... F02N 15/022
(Continued)

FOREIGN PATENT DOCUMENTS

CN   102791989 A    11/2012
CN   104554199 A    4/2015
(Continued)

*Primary Examiner* — Ian Jen
(74) *Attorney, Agent, or Firm* — LEYDIG, VOIT & MAYER, LTD.

(57) ABSTRACT

A velocity adjustment system for adjusting a driving velocity of a includes a driver control device configured to receive actuation input from a driver, the actuation input including an actuation parameter. The system further includes an actuation sensor configured to detect the actuation parameter and to output a sensor signal and a velocity control device configured to record the sensor signal and evaluate the actuation input. The velocity control device is designed to compare the actuation parameter with a reference value and to output, based on the comparison, a request signal to an engine control device or a braking request signal to brake control device of a brake system.

16 Claims, 4 Drawing Sheets

(51) Int. Cl.
  *B60K 26/04*  (2006.01)
  *B60W 10/06*  (2006.01)
  *B60W 10/18*  (2012.01)
  *B60W 30/18*  (2012.01)
(52) U.S. Cl.
  CPC . *B60W 30/18127* (2013.01); *B60K 2026/046* (2013.01)

(56) References Cited

U.S. PATENT DOCUMENTS

| | | |
|---|---|---|
| 2003/0190996 A1 | 10/2003 | Yone |
| 2012/0325042 A1 | 12/2012 | Takiguchi et al. |
| 2017/0361851 A1 | 12/2017 | Takeya et al. |
| 2019/0106103 A1 | 4/2019 | Inoue et al. |
| 2019/0143961 A1* | 5/2019 | Meyer ............... B60W 10/02 701/22 |

FOREIGN PATENT DOCUMENTS

| | | |
|---|---|---|
| CN | 106740749 A | 5/2017 |
| CN | 107206980 A | 9/2017 |
| CN | 108297686 A | 7/2018 |
| DE | 202012005176 U1 | 7/2012 |
| DE | 10315253 B4 | 1/2013 |
| DE | 102013202427 A1 | 8/2014 |
| DE | 102015212024 A1 | 12/2016 |
| DE | 102015226701 A1 | 6/2017 |
| DE | 102016005117 B3 | 7/2017 |
| EP | 0633155 B1 | 5/1998 |
| EP | 3030465 A1 | 6/2016 |
| JP | 2006168497 A | 6/2006 |
| KR | 20020031127 A | 4/2002 |
| WO | WO 2018077813 A1 | 5/2018 |

* cited by examiner

VELOCITY ADJUSTMENT SYSTEM FOR A VEHICLE, AND METHOD FOR ADJUSTING A DRIVING VELOCITY

CROSS REFERENCE TO RELATED APPLICATIONS

This application is a U.S. National Phase application under 35 U.S.C. § 371 of International Application No. PCT/EP2020/063400, filed on May 14, 2020, and claims benefit to German Patent Application No. DE 10 2019 113 225 8, filed on May 20, 2019. The International Application was published in German on Nov. 26, 2020 as WO 2020/234095 A1 under PCT Article 21(2).

FIELD

The present disclosure relates to a velocity adjustment system for a vehicle, in particular a commercial vehicle, and a method for adjusting a driving velocity of the vehicle.

BACKGROUND

Vehicles generally have a driver's control device to be actuated by the driver, in particular an accelerator pedal or driving pedal, for controlling the drive power. Depending on the drive engine, for example a combustion engine, electric motor or hybrid engine, which combines a combustion engine and an electric motor, driver engine request signals entered by the driver via the driver's control device are evaluated by an engine control device, which subsequently controls the vehicle engine accordingly, for example a fuel supply to the combustion engine or an electric power supply to the electric motor or the multiple electric motors used in the vehicle. Thus, in general, actively depressing the accelerator pedal is interpreted as an acceleration request of the driver and the control of the engine is increased accordingly. In some engine control systems, it is known to design a fast depression of the accelerator pedal as a so-called kick-down, which can set a higher fuel supply to enable higher acceleration.

The vehicle generally has one or more brake systems, such as a pneumatic or electro-pneumatic brake system; furthermore, in particular in commercial vehicles, sustained-action brake systems or wear-free brakes, in particular retarder brakes are provided in the powertrain, which can be activated by the driver, if necessary, by an additional actuation device for wear-free braking. Vehicles with electric motors may also have a recuperation mode to recover the—kinetic or potential—vehicle energy as electrical energy, which thus represents a regenerative brake. In order to reduce the driving velocity, i.e. for active braking, the driver generally depresses a brake pedal, which is subsequently read out and evaluated by a brake control device in an electronic brake system, so that braking is set accordingly as a negative acceleration of the vehicle by controlling the wheel brakes and/or sustained action brakes.

In the case of vehicles with an electric motor and a recuperation mode, it is also known in principle to start the recuperation mode automatically if the driver withdraws the driving request by releasing the accelerator pedal, i.e. an engine braking process corresponding to the overrun mode of conventional vehicles is used to recover electrical energy. Thus, the recuperation strategies are generally distributed over both pedals.

In addition, driving stability controls and comfort control systems are generally provided in the vehicle, which send external braking requests, so-called XBR requests ("eXternal Brake Request") to the electronic control unit of an electronic brake system, for example for stability controls by asymmetrical activation of the wheel brakes as well as for distance keeping controls.

In particular, the transitions between the different systems, especially in the evaluation of the driver request and the assignment of corresponding control signals to the vehicle engine(s) or one of the brake systems, are problematic. In particular, for safety reasons, the availability of the wheel brakes in the form of friction brakes is required, which can build up high vehicle decelerations rapidly. The aim is to achieve a pleasant driving experience for the driver and good controllability of both the acceleration requests and the braking behavior.

EP 0 633 155 B1 describes a method for controlling the powertrain of motor vehicles in which accelerator pedal movement processes are monitored and engine power control and shifting operations are analyzed, taking into account engine maps and shift characteristics. Here, power thresholds are selectively generated in the accelerator pedal path in order to display shift thresholds to the driver with a view to optimizing consumption. By means of such methods, the transition between different process stages or control ranges can thus be haptically indicated to the driver.

DE 10 2013 202 427 A1 describes a vehicle with an adjustment device arranged in the footwell and a method for controlling the longitudinal movement of the vehicle. Here, the driver can enter his driving requests in particular via a single control zone for acceleration and braking, wherein this control zone can be a touch-sensitive control surface, for example a touchpad.

DE 20 2012 005 176 U1 describes an extended brake light for cars and trucks in which an engine request can be activated when the brake pedal is actuated.

DE 10 2016 005 117 B3 describes a vehicle with an automatic transmission with which the driver usually outputs a target torque to the drive unit via an accelerator pedal, which automatically adjusts the corresponding gears or transmission ratios of the transmission. In the event of an imminent execution of a gear downshift, the control unit generates a haptic downshift notification by varying the accelerator pedal restoring force.

In DE 103 15 253 B4, an accelerator pedal device is described which contains a pedal reaction force provisioning device for providing a reaction force on an accelerator pedal. The reaction force is regulated by the driver on the basis of the degree of depression of the accelerator pedal.

SUMMARY

In an embodiment, the present disclosure provides a velocity adjustment system for adjusting a driving velocity of a vehicle. The velocity adjustment system includes a driver control device configured to receive actuation input from a driver, the actuation input including an actuation parameter. The system further includes an actuation sensor configured to detect the actuation parameter and to output a sensor signal and a velocity control device configured to record the sensor signal and evaluate the actuation input. The velocity control device is designed to compare the actuation parameter with a reference value and to output, based on the comparison, a request signal to an engine control device or a braking request signal to brake control device of a brake system.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

The present disclosure provides for creating a velocity adjustment system for a vehicle and a method for adjusting a driving velocity which enable safe control or regulation of the driving velocity and ease of use for the driver.

A velocity adjustment system according to the present disclosure can be used in particular to carry out a method; a method according to the present disclosure can be used in particular with a velocity adjustment system.

Here, the velocity adjustment system and the method according to a preferred design can be used with a vehicle engine with electrical recuperation, in particular an electric motor or a hybrid engine with electrical recuperation.

According to the present disclosure, a control device to be actuated by the driver is provided, which is to be actuated with an actuation parameter; In particular, a velocity adjustment pedal is provided, which is to be adjusted with a one-dimensional actuation parameter between a lower stop and an upper stop, for example with a swivel angle or correspondingly a linear adjustment. This actuation is read out by an actuation sensor, which accordingly outputs a sensor signal to a velocity control device. The sensor signal can thus represent or reproduce in particular a one-dimensional actuation parameter. In particular, the driver's control device may produce a one-dimensional adjustment against a restoring force; however, systems with for example a touch-sensitive surface may also be formed, which thus do not sense the mechanical adjustment, but a contact, for example a force or a pressure.

The velocity control device then evaluates the sensor signal and thus the driver's actuation and compares this with a reference value in order to decide, depending on this comparison, whether an engine request signal is output to an engine control device or a braking request signal is output to at least one brake control device. In particular, it can be compared whether the current measured value is smaller or greater than the reference value. The reference value can thus be a neutral pedal angle; thus if the driver enters a larger actuation parameter, for example the driver (velocity adjustment) actuation pedal is depressed more strongly, this is understood as a request of the driver for an acceleration process or for an engine actuation, but in the case of a smaller actuation it is understood as a braking request. Thus, the velocity control device can subsequently directly output an engine request or a braking request.

The reference value or the neutral position may be provided, for example at half the actuation travel of the actuation parameter, for example half the pedal travel; however, other designs are also possible here which support the driver's feel accordingly and thus for example enable finer controllability of the braking process and/or of the acceleration process. The reference value or neutral position can be fixedly predetermined but may also be variable. It can, for example also be changed or learned due to the driver's behavior in order to enable corresponding individual controllability for the respective driver.

The reference value or the neutral position of the actuation parameter may also be dependent on the driving velocity and/or on the velocity of the driver's actuation, i.e. for example on his pedal angular velocity.

A restoring force may also be fixedly predetermined, for example constant, or—corresponding to a restoring spring—may increase with increasing actuation by the driver. In addition, further haptic feedback may also be provided, in particular the neutral position may be indicated as haptic feedback in order to convey to the driver at any time the process currently being controlled by him and to enable a simple restoring capability. Thus for example, a detent may be provided in the neutral position, so that the driver experiences haptic feedback, for example a short-term stop, when passing through the neutral position.

In addition to the actuation position of the actuation parameter, the changes against time can also be evaluated; thus, a kick-down or a fast actuation of the driver's (velocity adjustment) control device can be understood as a request for rapid engine acceleration and—as is known—can be used for an increased power request. Furthermore, a fast release or a fast reset of the driver's (velocity adjustment) control device can also be assessed as a fast braking process, which is preferably used by the velocity control device, for example, not as a recuperation mode, but completely or additionally using the service brakes or friction brakes to enable safe braking with high deceleration. Thus, a fast or complete release of the driver's control device can also be understood as emergency braking.

When using an electric motor or a hybrid engine with electrical recuperation, the velocity control device may initially use braking processes requested by the driver for electrical recuperation, in particular as far as possible or useful. Thus, when a braking request by the driver is detected, the engine control device can first be activated with a recuperation request signal. In the case of for example higher deceleration requests or even in driving ranges with unfavorable recuperation properties, for example low driving velocity, the velocity control device can also directly control another brake system, for example a sustained-action brake (retarder) as a wear-free brake.

The velocity control device can also evaluate the respective driving situations, for example the driving velocity and coefficients of friction of the roads or the previous slip behavior of the wheels, wherein the differential slip can also be monitored, and can take this into account during control, for example also when selecting the brake system or the requested braking forces. The velocity control device can do this for example in worse adhesion conditions in which a pure reduction of the drive power is not sufficient and can then already activate a brake system.

This can be advantageously carried out by the velocity control device by means of braking request signals, wherein these braking request signals are output to the electronic brake control device as XBR signals, i.e.—as well as for example requests of comfort control systems or driving stability control systems—via a data system, for example a vehicle bus. These are then used as an XBR request to control the brake. This enables cost-effective implementation, especially the implementation of the velocity adjustment system in a vehicle with other control systems, in particular safety systems and comfort systems, since such XBR requests are known as such and are standardized and ensure a high level of safety. The brake system already has all the information available to make an assessment between recuperation and driving stability, for example based on the slip behavior of the wheels and/or the braking capability, so that advantageously all available brakes can be used seamlessly. This preferably includes both the friction brakes and the sustained action brakes (for example a retarder or an electric motor operated as a generator) and taking into account the braking availability of the electric motor operated as a generator in terms of the battery level or, in the other case, taking into account the expected utilization of the coefficient of friction in order to proactively exclude ABS intervention.

Since the driver thus basically inputs both acceleration requests and braking requests as actuation parameters via a common control device, in particular a common acceleration pedal or velocity adjustment pedal, the time-consuming operation changeover required when using an accelerator pedal and a separate brake pedal, i.e. first releasing the accelerator pedal and changing to the brake pedal, which require a considerable amount of time and may be too slow in stressful situations, is basically no longer necessary. The driver can enter his braking and acceleration requests via the common driver's control device. Thus, for example in situations where the driving velocity has to be reduced, the driver does not first have to consider whether releasing the accelerator pedal with the onset of the thrust effect of the engine is sufficient or whether active additional braking is required; he can directly reduce the velocity faster or slower by adjusting the actuation parameter, wherein the respective evaluation is then carried out by the velocity control device.

Thus, in principle, an adjustment of the driving velocity by the driver is possible via the one driver's control device, in particular the velocity adjustment pedal. In addition, in particular for safety reasons, an additional brake control, in particular a brake pedal, may be provided, which—as is known—directly issues a braking request when actuated. This driver braking request can be issued directly to the brake control device, i.e. not via the velocity control device, in particular for effective service braking. This ensures at any time that the driver can trigger fast and safe braking by pressing the brake pedal in the event of a detected danger or other high braking request—in a haptically known manner. Such a driver braking request is thus preferably directly read out in a conventional manner by the electronic brake control device and not recognized as an XBR request via the vehicle data system.

The use of sustained action brakes can also be combined in a way that is comfortable for the driver; here, a combined control of retarders and other brake systems is advantageous for the braking behavior and wear adjustment.

This also improves the driving feel and the braking feel for the driver; a velocity control system and a method are created which allow braking which is controlled in a deceleration-oriented manner for the driver, unlike conventional torque-oriented braking. The driver controls the driving velocity via the driver's control device instead of being oriented to the braking requests which he has to enter.

Embodiments of the disclosure are explained in more detail below on the basis of the enclosed drawings of some embodiments.

A vehicle 1 is in particular a commercial vehicle here which, according to the embodiment of FIG. 1, has a velocity adjustment system 2, wherein the vehicle 1 has a powertrain 17 and a brake system 12 and the velocity adjustment system 2 controls elements of the powertrain 17 and the brake systems 12 as described below:

The driver actuates a driver's control device which is designed according to this embodiment as a velocity adjustment pedal 3. The velocity adjustment pedal 3 can be adjustable by the driver's foot in the usual design along a pedal angle, which in this case represents the actuation parameter $\alpha$. However, a different actuation parameter $\alpha$ may also be provided, for example also a linear adjustment. The driver can also press a control surface for example and can exert a force or a pressure (force per area) as an actuation parameter a, i.e. without, or without relevant, mechanical adjustment of the control device; the control surface may thus also be for example a touch sensitive surface, for example a touch surface.

The pedal angle as an actuation parameter $\alpha$ is measured by an actuation sensor 4, which outputs a sensor signal S1 to a velocity control device 5: thus, the sensor signal S1 represents the actuation parameter $\alpha$, in particular as a parameter value between a lower sensor value $\alpha\_1$ (for example an unactuated upper position of the pedal) and an upper sensor value $\alpha\_t$ (fully actuated, lower pedal position).

The velocity control device 5 compares the received sensor signal S1 with a reference value $\alpha 0$, which may in particular be a resting position or neutral position, in particular a resting angle, which can represent, for example, half the pedal position between the minimum value $\alpha\_1$ and the maximum value $\alpha\_t$. The reference value $\alpha 0$ can be specified in particular, but it may—as will be explained below—also be variable, for example may also be learned or adapted. The velocity control device 5 thus compares the current pedal angle represented by the current sensor signal S1 with the reference value $\alpha 0$.

Figure 4:
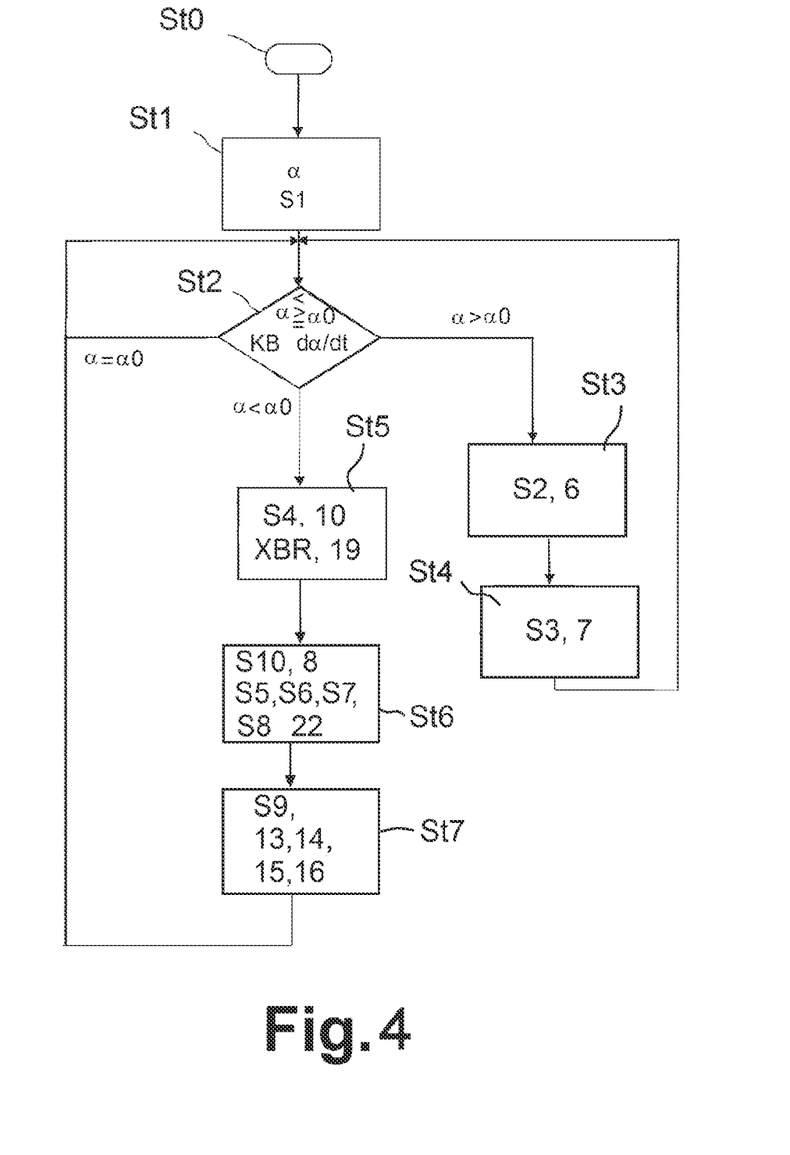
FIG. 4 shows a flowchart of a method.
Figure 5:
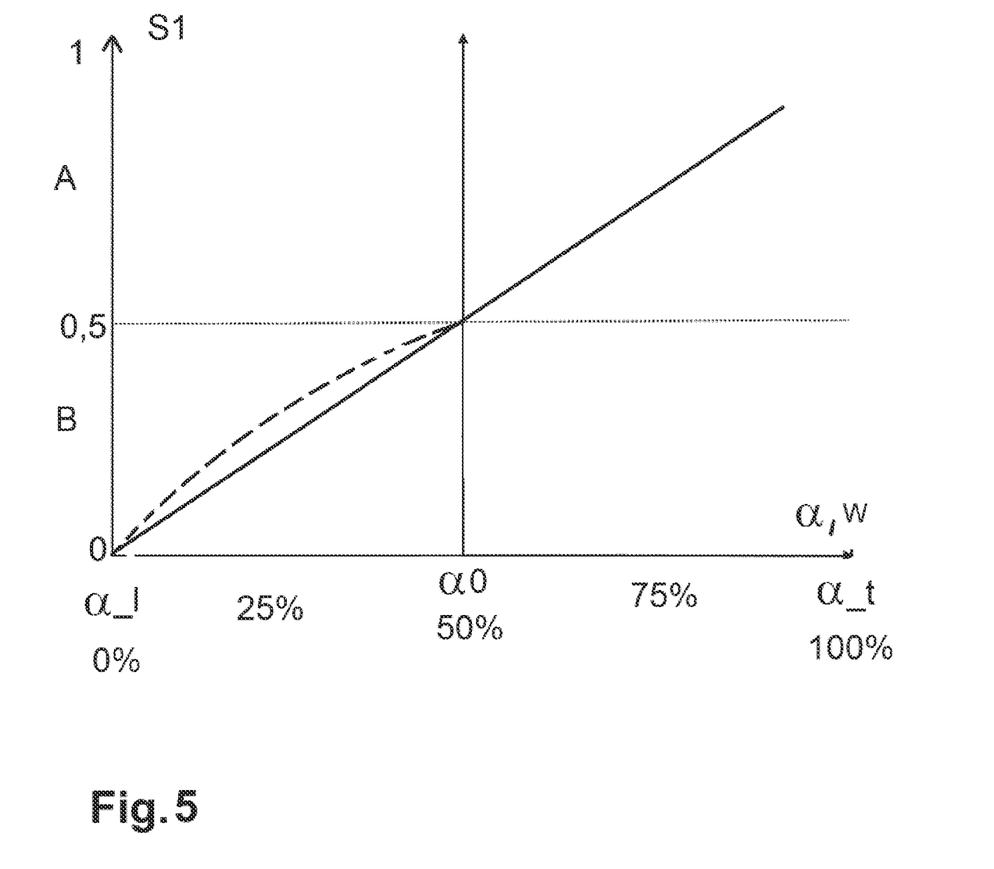
FIG. 5 shows a signal diagram of the actuation of the velocity adjustment pedal.

This is also shown in FIG. 4: after the start in step St0, the actuations of the velocity adjustment pedal 3 are continuously read out according to step St1 and, depending on this actuation, the sensor signals S1 are generated and output to the velocity control device 5. The velocity control device 5 then carries out an evaluation according to step St2, in which it thus compares the current pedal angle as an actuation parameter a with the reference value a0 and, depending on this comparison, if necessary additionally depending on other criteria, outputs control signals S2, S4, S10, S102:

FIG. 5 shows a signal diagram in which the actuation parameter $\alpha$, here thus the pedal angle, or a corresponding relative actuation value w between 0% and 100% is shown on the abscissa, and an analog signal value of the sensor signal S1 is shown on the ordinate.

From the unactuated position $\alpha\_1$ or w=0 up to the reference value $\alpha 0$, i.e. for example the relative actuation value w=0.5 (50%), the velocity control device 5 indicates a braking process, i.e. the driver will initiate a braking process by actuating the velocity adjustment pedal 3. According to FIG. 1, the velocity adjustment pedal 3 is located in the brake region B.

With a further actuation, i.e. $\alpha>\alpha 0$ or w>0.5, the velocity adjustment pedal 3 is located in the drive region A; this is interpreted as an active driving request, i.e. here the driver wants to influence the drive of the vehicle 1 accordingly due to the active actuation. This behavior thus corresponds to the usual depression of an accelerator pedal by the driver, with which he controls a drive power which can thus represent, for example, maintaining the current driving velocity v, and accordingly indicates an acceleration process on further actuation, i.e. an increase in the pedal angle, i.e. an acceleration α=dv/dt is >0 here.

Thus, the velocity adjustment pedal 3 combines a usual velocity pedal with a conventional brake pedal, wherein the neutral position as α0 reflects the transition of these regions.

The reference value α0 can thus be fixedly predetermined; but it can also be variable, for example as a function of the driving velocity v, as a function of the relative pedal velocity or the adjustment velocity dα/dt or a pedal gradient against time, depending on the maximum pedal positions set by the driver, whereby the anatomical characteristics are taken into account.

According to FIG. 5, braking is thus detected when the velocity adjustment pedal 3 is initially actuated, for example at the start of the journey; when the pedal is depressed, the driver first reduces the braking request and finally releases the brake on reaching the reference value α0. With further actuation, the drive region A is reached, which is assessed as the actuation of an accelerator pedal, i.e. as a drive request. In the case of a slow reduction of the pedal angle as an actuation parameter α, for example a velocity reduction, i.e. a reduction in engine power, is input accordingly, and on falling below the reference value α0 it is again detected that no more drive power is to be applied and braking power is to be applied again.

In principle, for example a fast release can be interpreted as a braking request at any pedal angle, i.e. if necessary the drive power is terminated immediately and a braking process, for example also emergency braking, is applied. Accordingly, for example at any pedal angle α a fast depression can be interpreted as a drive request, i.e. as a kick-down for a high acceleration a of the vehicle 1.

Figure 1:
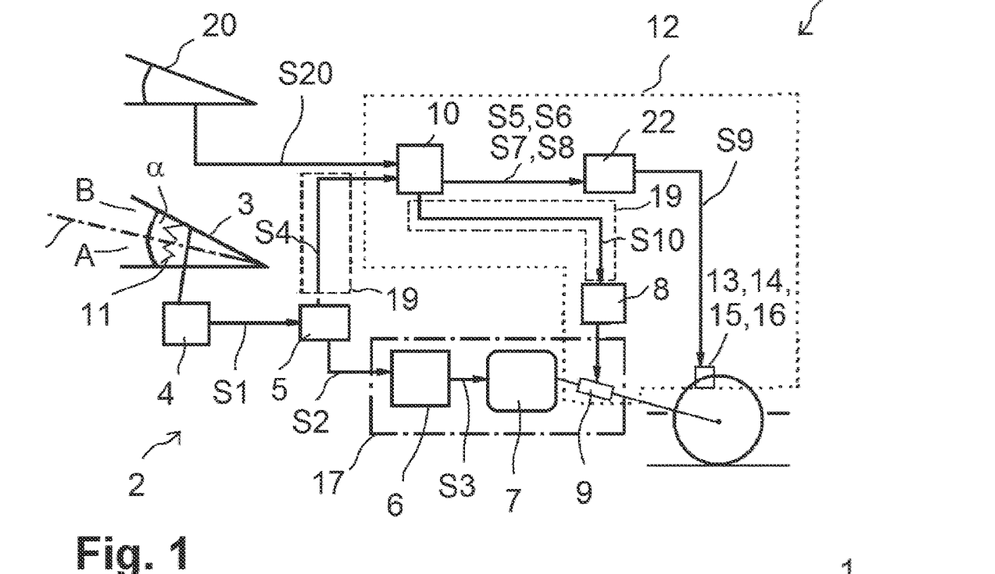
FIG. 1 shows a block diagram of a vehicle with a velocity adjustment system with a combustion engine, and a brake system which additionally has a retarder braking device.

The velocity control device 5 thus activates different control signals S2, S4, S10, S10, S102 according to FIG. 1 depending on the assessment in step St2:

If the velocity control device 5 detects in step St2 that a drive power is to be controlled, it outputs an engine control signal S2 in step St3, here to an engine control device 6, which in turn activates a vehicle engine in the usual way in step St4 with an engine control signal S3, hence a combustion engine 7 in this case.

If, on the other hand, the velocity control device 5 detects an active braking process, in step St5 it activates a brake control device 10 with a braking request signal S4, which thus represents an XBR signal and which is transmitted via a vehicle-internal communication system, in particular a data bus, for example a CAN bus 19. In principle, the electric brake control device 10 can control different braking devices, in particular it can be used in step St6 for example by outputting electric brake control signals S5, S6, S7, S8 to one or more electropneumatic valves, for example an axle modulator and/or a relay-proportional valve 22, which subsequently outputs pneumatic brake signals S9 to the wheel brakes 13, 14, 15, 16 in step St7.

Furthermore, the electric brake control device 10 can also output a retarder request signal S10 to a retarder control device 8, which controls retarder braking by a retarder 9, via a vehicle-internal communication system, in particular a data bus, for example the same CAN bus 19 or another data bus.

With α=α0, i.e. if the actuation parameter α is equal to the reference value α0, however, no output of a signal is required, so that in this case the method is reset before the step St2.

The selection of the brake system can be made depending on other criteria KB, such as one or more of the following braking selection criteria KB: driving velocity v, required target deceleration a_soll, wheel revolution rate, vehicle mass, axle load distribution, adhesion conditions or the coefficient of friction of the road.

The vehicle 1 may have in particular an EBS (electronic brake system) as the service brake system 12, so that the brake control device 10 consequently outputs electric brake control signals S5, S6, S7, S8 for the activation of pneumatic wheel brakes 13, 14, 15,16. In this case, for example proportional relay valves are provided on the axles or a proportional relay valve is provided on each axle, which can receive the brake control signals S5, S6, S7 and/or S8 and thus outputs a pneumatic brake pressure p to the respective pneumatic wheel brake 12, 13, 14 or 15 depending thereon.

According to this embodiment, furthermore, i.e. in addition to the velocity adjustment pedal 3, a brake pedal 20 is provided, which the driver actuates directly and which outputs a driver brake signal S20 to the brake control device 10 via an electric output. The brake control device 10 can thus control the service brakes directly as a function of the driver brake signal S20, and/or depending on the velocity adjustment control device 5.

Due to the additional driver's brake pedal 20, increased safety is provided, especially if the activation of the velocity adjustment control device 5 is not understood as a sufficient braking request, so that the driver can directly apply service braking at any time.

A spring preload is advantageously provided on the velocity adjustment pedal 3, i.e. a return spring 11, which moves the velocity adjustment pedal 3 into the unactuated position α_1. The return spring 11 can be linear or non-linear, especially with haptically perceived curves (feeling curve). Here, for example, a detent may also be provided at the reference value (neutral position) α0, so that the driver can haptically recognize the neutral position "do not drive, do not brake".

The velocity control device 5 can thus in particular also evaluate the pedal acceleration da/dt and for example in the event of a fast actuation (kick-down)—as is also customary when reading an accelerator pedal—can detect an increased power request or a higher velocity than the pure pedal position of the pedal angle α expresses directly. Accordingly, a fast release of the velocity adjustment pedal 3, i.e. a high negative value of dα/dt, can be detected as a fast braking process, even if it assumes a pedal position α in the drive region A. Thus, according to step St2, not only can the direct comparison of the pedal angle α with the neutral position α0 be carried out, but also an evaluation of dα/dt, i.e. the dynamic behavior, for example as a comparison with threshold values SW1, SW2.

Figure 2:
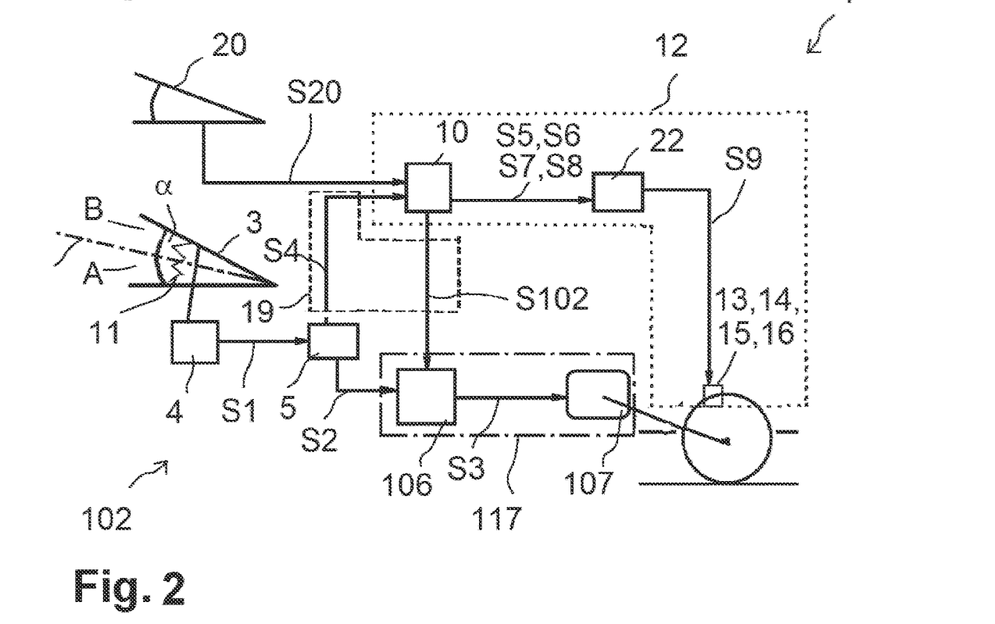
FIG. 2 shows a block diagram of a vehicle with a velocity adjustment system with an electric motor and a service brake system.

In the embodiment of FIG. 2, the velocity adjustment system 102 has an electric motor 107 instead of a combustion engine, the engine control device 106 of which in turn is controlled by the velocity control device 5 by engine request signals S2. Here it is advantageously provided that the velocity control device 5 can also request a braking power of the electric motor 107 as a recuperation mode or as energy recovery by recuperation request signals S102. In principle, the engine control device 106 can also decide when it will set recuperation mode. Also in this embodiment according to FIG. 2 a service brake system is advantageously additionally provided with a brake control device 10 and advantageously also a supplementary brake pedal 20.

Figure 3:
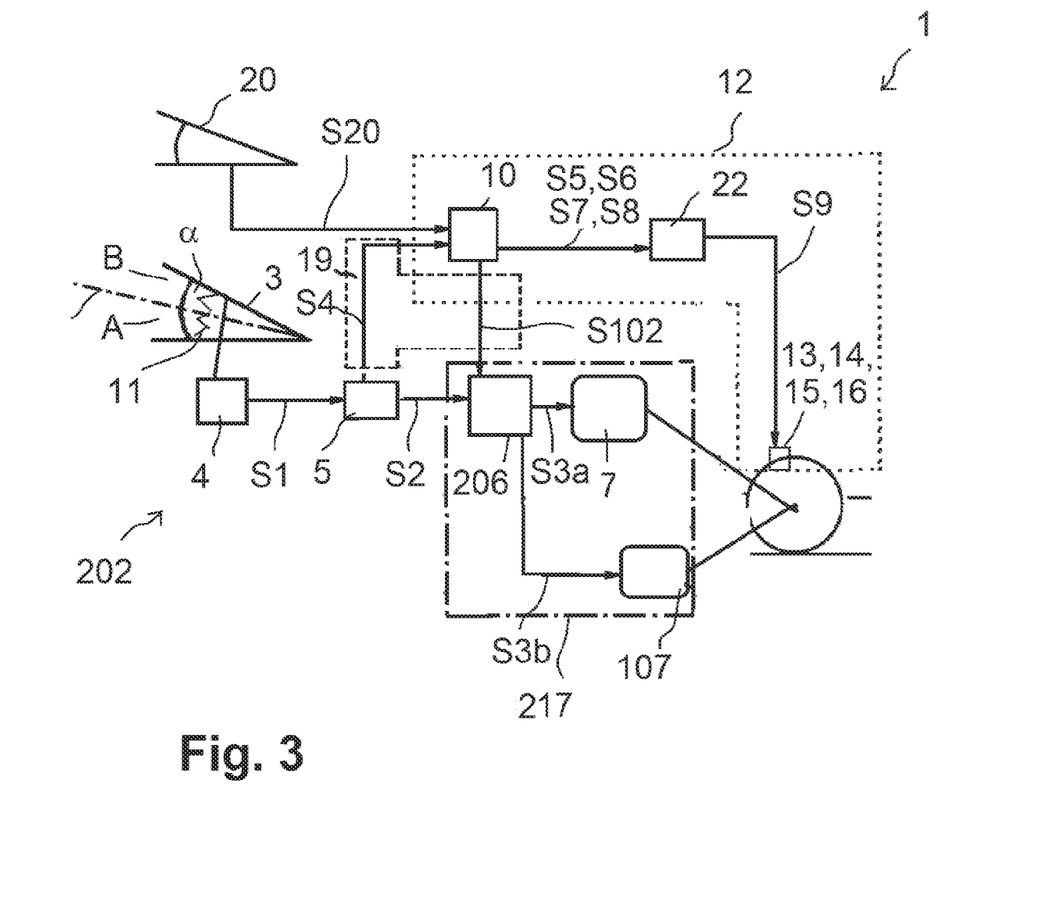
FIG. 3 shows a block diagram of a vehicle with a velocity adjustment system with a hybrid system.

In the embodiment of FIG. 3, a hybrid system 202 is present, in which the designs of FIGS. 1 and 2 are thus combined. Thus, there is a hybrid powertrain 217 with an engine control device 206, which can control a combustion engine 7 and/or an electric motor 107, which together form the hybrid engine 207. Here, too, a recuperation mode can be requested.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE CHARACTER LIST (PART OF THE DESCRIPTION)

1 Vehicle
2, 102, 202 Velocity adjustment System
3 Velocity adjustment pedal, Driver's control device
4 Actuation sensor
5 Velocity control device
6, 106, 206 Engine control device
7 Combustion engine
8 Retarder control device,
9 Retarder (Endurance brake)
10 Brake control device
11 Return spring, spring preload
12 Brake system combining for example a service brake system and a retarder brake system,
13, 14, 15,16 Pneumatic wheel brakes
17, 117, 217 Powertrain
19 Vehicle-internal communication system, for example CAN bus
20 Driver brake pedal
22 Relay-proportional valve
107 Electric motor
$\alpha$ Actuation parameter, for example pedal angle
$\alpha 0$ Reference value, in particular rest position, neutral position, center angle, for example half pedal position
$\alpha\_1$ Minimum value (for example unactuated position of the velocity adjustment pedal 3)
$\alpha\_t$ Maximum value (for example actuated position of the velocity adjustment pedal 3)
$d\alpha/dt$ Actuation velocity, for example pedal actuation velocity
w Relative actuation value, between 0% and 100%
v Driving velocity
$\alpha=dv/dt$ Vehicle acceleration
a_soll Target deceleration
A Drive region, for $\alpha>\alpha 0$ or w>50%,
B Braking region, for $\alpha<\alpha 0$ or w<50%
S1 Sensor signal
S2 Engine request signal of the velocity control device 5 to the engine control device 6, 106, 206
S3 Engine control signal of the engine control device 6 to the combustion engine 7 and the engine control device 106 to the combustion engine 107
S3a Engine control signal 206 to the combustion engine 7
S3b Engine control signal 206 to the combustion engine 107
S4 Braking request signal, especially XBR signal
S5, S6, S7, S8 Brake control signals
S9 Pneumatic brake signal
S10 Retarder request Signal
S20 Driver brake signal to the brake control device 10
S102 Recuperation request signal
P Pneumatic brake pressure

The invention claimed is:

1. A velocity adjustment system for adjusting a driving velocity of a vehicle, the velocity adjustment system comprising:
a driver control device configured to receive actuation input from a driver, the actuation input including an actuation parameter;
an actuation sensor configured to detect the actuation parameter and to output a sensor signals; and
a velocity control device configured to record the sensor signal and evaluate the actuation input;
wherein the velocity control device is designed to compare the actuation parameter with a reference value and to output, based on the comparison, a request signal to an engine control device or a braking request signal to brake control device of a brake system.

2. The velocity adjustment system as claimed in claim 1, wherein the actuation parameter is one-dimensional.

3. The velocity adjustment system as claimed in claim 1, wherein the velocity control device is configured to compare a current value of the actuation parameter with a reference value and evaluate whether the current value of the actuation parameter is greater than or less than the reference value.

4. The velocity adjustment system as claimed in claim 1, wherein the velocity control device is configured to:
detect, in response to the actuation parameter exceeding the reference value, a power request and/or activation of the engine control device, and
detect, in response to the actuation parameter falling below the reference value, a detects a braking request and/or activation of a brake control device.

5. The velocity adjustment system as claimed in claim 1, wherein the reference value corresponds to a middle region of possible actuation parameter values.

6. The velocity adjustment system as claimed in claim 1, wherein the reference value is marked by a haptic feedback to the driver control device.

7. The velocity adjustment system as claimed in claim 1, wherein the reference value is variable and/or learnable according to one or more of the following criteria:
actuation velocity of the driver control device,
a gradient of actuation of the driver control device, and
maximum and minimum values, set by the driver, of the actuation parameter of the driver control device.

8. The velocity adjustment system as claimed in claim 1, wherein the velocity control device is configured to output the braking request signal to the brake control device as an external braking request signal via a vehicle-internal communication system.

9. The velocity adjustment system as claimed in claim 1, further comprising, in addition to the driver control device, a driver brake control device wherein the driver brake control device is configured to, when actuated by the driver, output driver brake signals to the brake control device.

10. The velocity adjustment system as claimed in claim 1, wherein the velocity control device is configured to, in response to detecting a brake request and/or issuing a brake request signal, determine whether to output a recuperation request signal to an engine control device of an electric motor or a hybrid engine, for setting a recuperation mode to decelerate the vehicle.

11. A vehicle, comprising:
a velocity adjustment system as claimed in claim 1,
a powertrain with a vehicle engine, and
a brake system,
wherein the velocity control device is configured to output the engine request signal to an engine control device of the powertrain, and
wherein the brake control device is a brake control device of the brake system.

12. The vehicle as claimed in claim 11, wherein the powertrain has an electric motor and/or a hybrid engine with an electric motor configured to be set into a recuperation mode for energy recovery on the output of a recuperation request signal from the brake control device.

13. A method for adjusting a driving velocity of a vehicle having a powertrain with a vehicle engine and a brake system, the method comprising:
measuring an actuation parameter of a driver control device and generating a sensor signal;
evaluating the actuation of the driver control device by comparing the sensor signal and/or the actuation parameter with a reference value;
outputting, based on the comparison, an engine request signal to an engine control device of the powertrain or a braking request signal to a brake control device of the brake system; and
activating the vehicle engine by the engine control device and/or activating a brake of the brake system by the brake control device.

14. The method as claimed in claim 13, wherein a vehicle engine is controlled with an electrical recuperation mode and, when outputting braking request signals recuperation request signals are also output to an engine control device for setting a recuperation mode.

15. The method as claimed in claim 13, wherein, as an actuation parameter, a position of the driver control device and/or a change of the position against time is evaluated.

16. The method according to claim 13, wherein a selection of the brake system is made based on brake selection criteria which evaluate one or more of the following parameters: driving velocity, required target deceleration, wheel revolution rates, vehicle mass, axle load distribution, and adhesion conditions/coefficient of friction of the road.

* * * * *